(12) United States Patent
Brandstatter

(10) Patent No.: US 7,970,015 B2
(45) Date of Patent: Jun. 28, 2011

(54) METHOD FOR TRANSMITTING A MESSAGE BY COMPRESSED DATA TRANSMISSION BETWEEN A SENDER AND A RECEIVER VIA A DATA NETWORK

(75) Inventor: Klaus Brandstatter, Rosstal (DE)

(73) Assignee: HOB GmbH & Co. KG, Cadolzburg (DE)

( * ) Notice: Subject to any disclaimer, the term of this patent is extended or adjusted under 35 U.S.C. 154(b) by 539 days.

(21) Appl. No.: 11/222,771

(22) Filed: Sep. 12, 2005

(65) Prior Publication Data

US 2007/0058610 A1    Mar. 15, 2007

(51) Int. Cl.
 *H04J 3/18* (2006.01)
(52) U.S. Cl. .......................................... 370/477; 710/68
(58) Field of Classification Search .................... 370/442
 See application file for complete search history.

(56) References Cited

U.S. PATENT DOCUMENTS

| | | | |
|---|---|---|---|
| 6,301,681 B1 * | 10/2001 | Chen et al. | 714/751 |
| 2001/0037356 A1 * | 11/2001 | White et al. | 709/201 |
| 2002/0107803 A1 * | 8/2002 | Lisanke et al. | 705/51 |
| 2003/0030575 A1 * | 2/2003 | Frachtenberg et al. | 341/51 |
| 2003/0067903 A1 * | 4/2003 | Jorgensen | 370/338 |
| 2005/0086383 A1 | 4/2005 | Le et al. | |
| 2005/0168770 A1 * | 8/2005 | Kurose et al. | 358/1.15 |
| 2006/0023652 A1 * | 2/2006 | Vedantham et al. | 370/312 |
| 2007/0058610 A1 * | 3/2007 | Brandstatter | 370/352 |

FOREIGN PATENT DOCUMENTS

EP    1 134 900 A1    9/2001

* cited by examiner

*Primary Examiner* — Jianye Wu
(74) *Attorney, Agent, or Firm* — Browdy and Neimark, PLLC

(57) ABSTRACT

A method for transmitting a message by compressed data transmission between a sender and a receiver using connectionless or connection oriented protocols. The sender gateway assures that the appropriate handling of the message data is made by knowing the transmission protocol(s) used. T The rules and structures of the protocol(s) must be known to be able to use a compression method ideally suited to the needs of the particular protocol. Both gateways analyze the data stream between sender and receiver, compress outgoing and decompressing incoming data. For connection oriented protocols, differently structured data structures are transmitted during a connection. To distinguish different data structures, the gateway providing for compression examines the data to be transmitted and, by knowing the definition of the protocol used and the state of the machine, it can control the compression to use a file-oriented compression on certain parts of the data stream.

8 Claims, 2 Drawing Sheets

METHOD FOR TRANSMITTING A MESSAGE BY COMPRESSED DATA TRANSMISSION BETWEEN A SENDER AND A RECEIVER VIA A DATA NETWORK

FIELD OF THE INVENTION

The invention refers to a method for transmitting a message by compressed data transmission between a sender and a receiver via a data network.

BACKGROUND OF THE INVENTION

Before turning to the invention an explanation of the background of compressed data transmission applied to different kind of transmission protocols and the efficiency of data compression is to be given. Inasmuch a major influence on the efficiency of a data compression process is the portion of the uncompressed data that can be used by the data compression algorithm to analyse the data and their structure. The more data the data compression algorithm can analyse, the greater the efficiency of the compression process is as long as the data have a more or less homogeneous structure. If, e.g., a text document has to be compressed, the compression result will be best if the compression algorithm can analyse a certain amount of the text before starting to compress. If the algorithm would have to handle small bits of the text independently from each other, the result would certainly be worse.

Apparently, an algorithm, that does not handle an amount of data as a whole but compresses the data block by block, each independently from the other, at the sending side of a data transmission and decompresses the data vice versa at the receiving side, will not reach a maximum of efficiency.

An algorithm which on the one hand breaks the data into smaller blocks but on the other hand stores information about each compressed block and thus about the last parts of the document already compressed, optimizes the compression of the respective following block and thus will work with improved performance. In this case, the information about the data increases with every block compressed, and the efficiency of the compression will, if the data is of an appropriate structure, increase as well. Since, as mentioned above, the compression is depending on the information that has already been gathered about the document, the receiver has to analyse the incoming data as well and collect information in the same way the sender does, to be able to decompress the data. As a result of analysing the already compressed or decompressed data, both sender and receiver have exactly the same information about the data at hand, when processing one particular piece of the data. That means in particular that the single parts of the document have to go through the compression algorithm in exactly the same order as they go through the decompression algorithm.

Now basically the data transmission between a sender and a receiver via a data network is organized by a protocol defining the rules of establishing a connection between sender and receiver and for the data exchange between same. Here a distinction is made in information technology between so-called connectionless and connection oriented protocols for networking. In the case of a connectionless protocol, sender and receiver do not exchange any information in excess of the actual data. If more than one data packet is sent, each packet is transmitted absolutely independent from any of the others and the sender does not get a confirmation whether or not the packet has been received. Thus it is not sure whether the first packet sent will be the first packet received, i.e. the order in which the packets are received does not necessarily equal the order in which they were sent. It is not even guaranteed that a packet has reached its destination at all.

In the case of a connection oriented protocol the data packets contain additional information that allow the communication partners to find out, when a connection starts and ends, in which order the single packets were sent and if a packet is missing. Moreover there is normally a definition that the sender waits for a confirmation-of-receipt reply of the receiver and what to do if a packet is missing, e.g. to resend the packet.

It is possible to use a connectionless protocol as a base protocol for a connection oriented protocol. With e.g. the TCP/IP protocol, the connectionless IP protocol is used to send connection oriented TCP packets, i.e. in TCP, IP packets which contain information about connection start and end and about packet order are exchanged.

From the above it is apparent that data traffic with connectionless protocols can not be compressed as efficiently as data sent over a connection oriented protocol. The reason is that according to the rules of the used transmission protocol, the data are separated into single packets before being sent separately and one after the other to the receiver. In case of a connectionless protocol one can only compress each packet on its own, independent from any other, because it is not known when the transmission of a connected amount of data begins or ends and in which order the packets arrive at the receiving end. Inasmuch the compression cannot be done as efficiently as if a connection oriented protocol is used, where the packets are sent in a specific order and the whole transmission can be compressed in context.

Opposite to a connectionless protocol—as stated above—when using a connection oriented protocol it would be possible to compress the complete set of data sent during a connection as if it would be one homogeneous document. The problem, however, is that it is not known when a single transmission ends and when the sender is waiting for the receiver to reply. In this case, the whole connection would die if the data would not be sent because the sender is still waiting for more data to compress. Thus, normally only that part of the data is compressed that the sending program puts into one block. To distinguish these blocks from the data packets created by the transmission protocol they are denominated as records. But instead of compressing each record separately from each other, the compression algorithm could collect information about each record which it uses to optimize compression for the next record as described above. This is called "record oriented compression". The act of emptying the buffers used by the compression algorithm and transmitting the compressed data to the network protocol is called "flush". With a record oriented compression such a flush is done after each record.

While record oriented compression is no problem using a connection oriented protocol, it can not be used with connectionless protocols, since there, as described above, single data packets are transmitted independently without taking care of their order. But even with connection oriented protocols record oriented compression is not necessarily the most efficient technique to use as can be seen from the following.

SUMMARY OF THE INVENTION

A first object of the invention is to provide for a method for transmitting a message by compressed data transmission between a sender and a receiver which allows more efficient record oriented compression with connectionless protocols.

It is a second object of the invention to provide for a method for transmitting a message by compressed data transmission between a sender and a receiver via a data network which is more efficient as concerns the compression when using connection oriented protocols.

The first object is achieved by a method for transmitting a message by compressed data transmission between a sender and a receiver via a data network comprising the steps of
- a) providing for a sender side gateway associated to said sender and a receiver side gateway associated to said receiver,
- b) the sender fractionizes the message to data records and sending said data records to the sender side gateway under a connection oriented protocol,
- c) said sender side gateway in a record oriented compression successively compressing said data records to compressed data records by a compression process collecting and analyzing said data records and optimizing compression from data record to data record,
- d) said sender side gateway transforming the compressed data records to a connectionless protocol,
- e) said sender side gateway transmitting said compressed data records in packets to the receiver side gateway via said data network under the connectionless protocol,
- f) said receiver side gateway transforming said compressed data records back to the connection oriented protocol under re-establishing the order of the packets,
- g) said receiver side gateway decompressing said compressed data records from said packets to said data records, and
- h) said receiver side gateway sending said data records to the receiver under said connection oriented protocol.

The sender side gateway assures that the appropriate handling of the message data is made by knowing the used transmission protocol(s). The rules and structures of the protocol(s) have to be known to be able to use a compression method ideally suited to the needs of the particular protocol. In principle both gateways have according functions, namely they analyze the data stream between sender and receiver, compress outgoing and decompress incoming data. If need be, they might add some data for use of the partner gateway to the data stream. In practice, however, the two gateways are different programs, since many protocols require different behavior from sender or receiver side, respectively.

Summing up when relying on a connection-less protocol the gateway which compresses the data to be transmitted reorders the network packets and thus can use compression which is improved by the knowledge about the "data history", i.e. the data structure in previous network packets.

Now according to the first embodiment of the invention in above mentioned step b) the data packets sent by the sender under connection oriented protocol are enriched with control information by the connection oriented protocol, which guarantees order and completeness of the data. Now to use a record oriented compression under a security oriented protocol like IPSec, where the data packets are encoded for security, the processes of compressing and decompressing the data have to be connected with the processes of transforming the data from the connection oriented to the connectionless protocol and vice versa. This is done by above process steps c) and d) on the one hand as concerns sender side and process steps f) and g) on the other hand as concerns receiver side.

According to a preferred embodiment a data window is introduced into the process which is a maximum predefined data size for the compression process of step c) in one cycle. This solves the problem of a connection oriented protocol like TCP/IP sending acknowledgements to confirm that the data has been received at the other end of the connection. In this protocol the sender only sends a certain amount of data of this window size, the exact number of which is depending on implementation and configuration and may even change during a connection. The sender then stops sending until enough of the data sent has been acknowledged until it sends the next data packets without exceeding the window size. In fact for each block of data, the sender waits for a certain amount of time and, if no acknowledgement for that block was received during this time, the block is sent again. If the compression process would try to collect more data than the window size and accordingly the compressed data are not submitted to the receiver side, the sender would stop sending data and wait for acknowledgements which would never occur. In that case, the communication would simply die, because the sender gateway would ignore the resent blocks, because it had already received them, and the sender wouldn't send any new blocks until it gets acknowledgements. Inasmuch the gateway and the compression algorithm have to take care, that a sufficient amount of data is sent to the receiving end, so that enough acknowledgements are created to have the sender cause to send further data. This may include changing the TCP window size.

The second object is achieved by a method for transmitting a message by compressed data transmission comprising the steps of
- A) providing for a sender side gateway associated to said sender and a receiver side gateway associated to said receiver,
- B) the sender transmitting the message to the sender side gateway,
- C) the sender side gateway analyzing the message for compressible message parts and uncompressible message components,
- D) the sender side gateway in a file oriented compression compresses a compressible part of the message to at least one compressed data file by a compression process analyzing the compressible part and optimizing compression accordingly,
- E) the sender side gateway transmitting the uncompressible message components to the receiver side gateway without compression or with record oriented compression as defined in above mentioned step c) and the at least one compressed data file to the receiver side gateway under a connection oriented protocol,
- F) the receiver side gateway decompressing the compressed data file and combining the decompressed message part with the uncompressible message components to the message, and
- G) the receiver side gateway sending said message to the receiver.

Aforesaid transmitting method improves the efficiency of data transmission under connection oriented protocols, as record oriented compression might not mean maximum efficiency when dealing with connection oriented protocols. A certain number of differently structured data structures are transmitted during a connection. Some of them have to be treated record oriented, because otherwise the communication would die, e.g. if the sender is waiting for an answer from the receiver, some are so small that they are already handled with maximum efficiency using record oriented compression. Some on the other hand are bigger, related data structures which could be compressed with more efficiency if handled as one structure, while others should not be compressed at all, because their structure is unsuitable for it, e.g. already compressed data. To distinguish different data structures the gateway providing for the compression examines the data to be transmitted and by knowing the definition of the used protocol and the state of the machine it can control the compression to use a file-oriented one on certain parts of the data stream. No flush is needed in this part.

Now e.g. SMTP (Simple Mail Transfer Protocol), which is used for the transmission of electronic mail, a text message and besides the actual message additional information, like the name of the sender and the recipient, are transmitted. Instead of simply doing record oriented compression, it would be more efficient to compress all the data, which does not make up the message, either record oriented or not at all and to compress the actual message isolated from that as one single document. In principle one can say, that the efficiency of a data compression using a connection oriented protocol can be raised by analysing the data stream to find out when a bigger, related, homogeneously structured data structure is transmitted. With that information at hand, data can then be compressed with higher efficiency.

With this so-called file oriented compression, there is no flush after each record. Flushing is only done when demanded by the rules of the compression process, at the end of the data or when needed to keep the acknowledgement process running.

Doing so, it is necessary, that the receiver side gateway knows when the end of the compressed data is reached. If this information has not already been sent through the protocol used, the sending gateway has to add the corresponding information into the data stream itself. This may be a length field or a special data sequence signalling the end of the data.

Not all protocols are equally suited for file oriented compression. E.g. the RDP protocol used by terminal servers can not easily be divided into parts to be compressed and parts not to be compressed. A FTP data connection on the other hand, which basically does file transfer, can be compressed file oriented from the beginning to the end.

Another thing which has to be considered is, if the data is already compressed. RDP e.g. sends graphic and some other data in compressed form. Especially graphic data are often already compressed, like with HTTP or the above mentioned SMTP. Since compression of already compressed data is normally extremely inefficient, that kind of data should be left uncompressed for the transmission.

Finally the methods for transmitting compressed data according to the invention can be used in a so-to-speak multistage compression routine. For this sake according to another preferred embodiment of the invention the sender side gateway checks the incoming data as to what protocol is relevant, from this determines well-compressible parts of the data, like the Base64-coded MIME-part of an e-mail message, compresses these data in a file-oriented way and transfers these pre-compressed data to the actual compression step. In light of the previously cited MIME-part of an e-mail message said pre-compression is realized by removing the Base64 coding thus saving an arbitrary amount of data to be transmitted.

DESCRIPTION OF THE PREFERRED EMBODIMENTS

Figure 1:
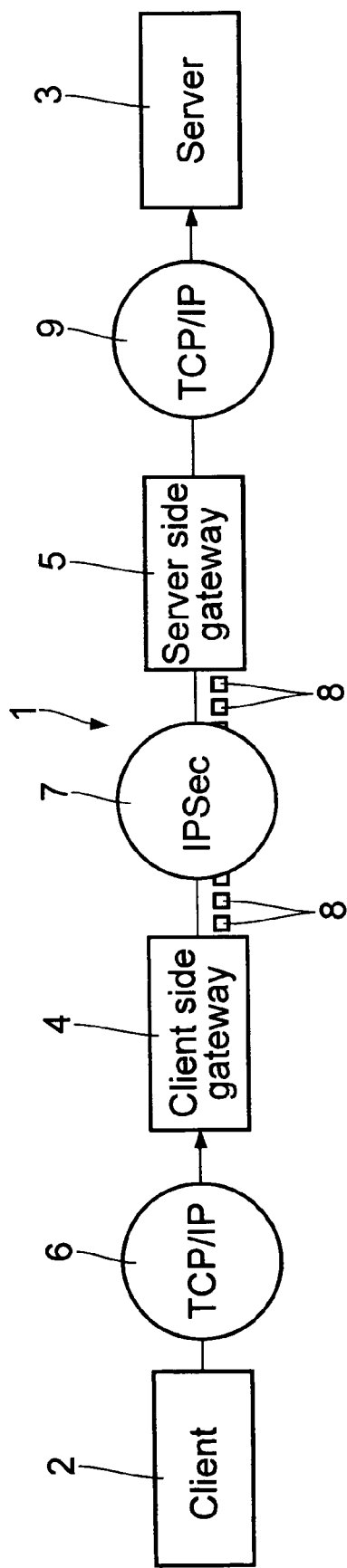
FIG. 1 is a block diagram of a data network between a sender and a receiver depicting record oriented compression with connectionless protocols and FIG. 2 is a block diagram of a data network between an e-mail client and an e-mail server using file oriented compression for e-mail transmissions.

FIG. 1 depicts an Internet connection 1 as data network between a client 2 as sender and a server 3 as receiver. At the sending end a client side gateway 4 representing a sender side gateway is associated to said client. Equally at the receiving end a server side gateway 5 as receiver side gateway is associated to the server 3. Both gateways 4, 5 are software programs running on the client 2 and server 3, respectively. Said gateways 4, 5 might be separated from the client 2 or server 3 as concerns program organization and technique, but could also run on one computer under one operating system.

The client 2 is sending a message under the TCP/IP protocol by fractionizing the message to data records and sending said data records to the client side gateway 4 under the connection oriented protocol TCP enumerated as 6. The client side gateway 4 according to its function analyzes the data stream incoming from the client 2 and successively compresses the incoming data records to compressed data records in a record oriented compression. The latter means that in the compression process the data records from the client 2 are collected, analyzed and the compression process accordingly optimized from data record to data record.

The client side gateway 4 transforms these compressed data records to a connectionless protocol like IPSec, as is depicted under numeral 7 in FIG. 1, and transmits said compressed data records in packets 8 via the Internet connection 1 under the IPSec protocol to the sender side gateway 5 at the receiving end. Flushing the buffers of the client side gateway 4 after compressing each packet accords to sending a compressed data record. At the receiving end the server side gateway 5 transforms said compressed data records back to the connection oriented protocol TCP re-establishing the order of the packets 8 by according information included in the data records due to the emission of the data records by the client 2 under the connection oriented TCP protocol in 6. Next the server side gateway 5 decompresses said re-ordered compressed data records and sends the thus generated data records representing the message to be transmitted to the server 3 under the connection oriented protocol TCP as is depicted under numeral 9 in FIG. 1.

The connection oriented protocol TCP used as basis of the described data transmission works with acknowledgements to confirm that data of the message to be transmitted between the client and the server 3 has been received at the receiving end of the connection. To avoid a conflict between the acknowledgement process and the data compression process the latter in one cycle collects and compresses data records of an overall data size, which is maximum a pre-defined data size of a data window. This so-called window size is depending on implementation and configuration of the data transmission. By restricting one cycle of the compression process to this window size and transmitting data records within the limits of this data window it is assured that at any time the server 3 transmits back an acknowledgment of receipt of data records via the server side gateway 5 to a client side gateway 4 and the client 2 which upon receiving said acknowledgement continues to transmit data records in the next data transmission cycle to the client side gateway 4 again for compression and transmission to the server side gateway 5 and server 3. Thus the data connection between the client 2 and the server 3 cannot die as was outlined as severe problem in the introduction of the specification.

In this connection a special handling of the window size may be advantageous. The gateway 4, 5 which does the compression might either alter the window size or this gateway 4, 5 provides for a flush to assure to remain in the limits of the window size.

Commonly, the window size is negotiated between the client and server who are the two session partners at both ends of a communication. Now according to the invention the respective gateway 4, 5 providing for the compression either knows this window size by monitoring aforesaid "negotiations" or it actively alters the window size by sending the necessary parameters in network packets to the session partners, i.e. the client 2 and server 3.

In connection with FIG. 1 an embodiment of a data compression, transmission and decompression under a TCP/IP protocol using IPSec was explained. However, the according compression and transmission technique can be used in other environments and protocols, like the applicant's Web-Secure-Proxy with SSL. Further examples are the protocols 3270 or TN 3270, which are used for a communication of clients with mainframe computers. All these protocols—as in TN 5250—end with FF EF. Now with the method of the invention the data stream on the sender side can be analyzed by the sender-side gateway and if this sequence is found in the data stream (and no new record block is started) a flush is necessary and made under this process of record-oriented compression and transmission. Otherwise the sender gateway can continue collecting data to gain more information about the data and thus to reach a better compression ratio.

Under the 3270 protocols also structured field file transfer is possible e.g. for the transmission of terminal images, transmitting larger data blocks in the data stream. When such data transfer is chosen by the client and server all the contents of the transmitted file can be completely compressed using file-oriented compression. Accordingly no flush of data records is necessary. The client-side gateway or server-side gateway providing for the compression has to monitor the data stream to find the "trigger" for a structured field file transfer which is for the server-client transmission WCC=0XF3 or 0X11. For a client-server transmission the Op-code is 0X88. The Op-code for the following file transfer is 0XD0.

Figure 2:
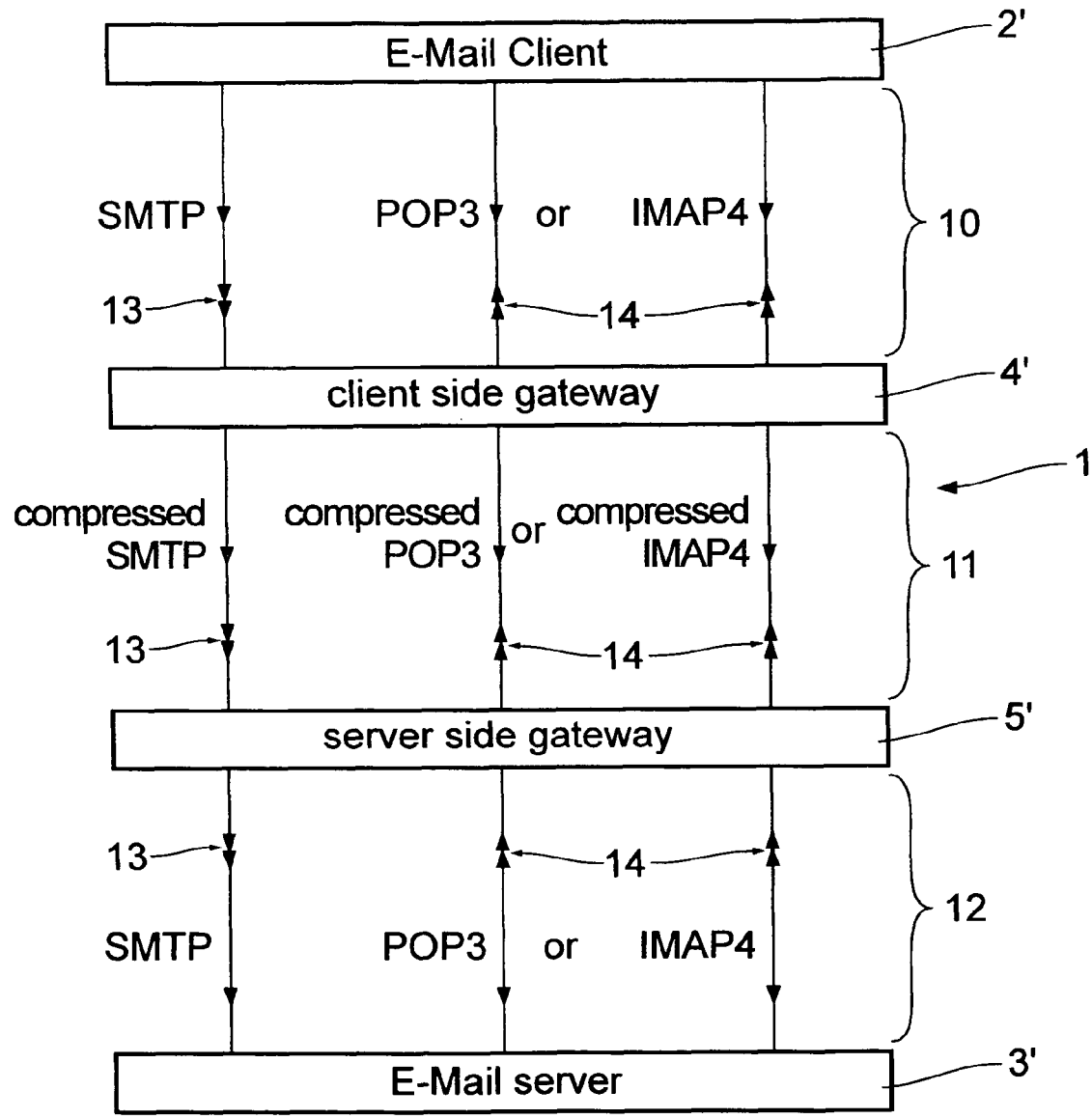

Referring to FIG. 2 another preferred embodiment for a method for transmitting a message by compressed data transmission between a sender and a receiver using file oriented compression exemplified by the handling of e-mail transmissions under the SMTP, POP3 and IMAP4 protocols are explained. Again we have an internet connection 1 between an e-mail client 2' and an e-mail server 3, e.g. a Microsoft® MS Exchange server 3'. Further on the e-mail client 2' is provided with a client side gateway 4' likewise the e-mail server 3' is provided with a server side gateway 5'. The e-mail client 2' sends and receives electronic mail to and from the e-mail server 5' by using the protocol SMTP for sending the mails and POP3 or IMAP4 for receiving mails from the e-mail server 5'. In the latter cases the e-mail server 5' is the sending end and the client 2' the receiving end of the connection.

Basically, the e-mail client 2' initiates a connection enumerated as 10 in FIG. 2 to the client side gateway 4' indicating what kinds of protocols are used for sending and receiving mails from the mail server 3', i.e. according to FIG. 2. SMTP for sending and POP3 or IMAP4 for receiving. The client side gateway 4' analyses the e-mail message sent by the e-mail client 2' for compressible message parts, like texts and uncompressible message components. "Uncompressible" in this connection should cover message parts which are not efficiently compressible, like already compressed graphic data, short information, like message headers or data records which make sense to be processed by record oriented compression. The client side gateway 4' accordingly analyses the message for these compressible message parts and uncompressible message components.

Then the client side gateway 4' establishes a connection 11 reporting to the server side gateway 5' which of aforesaid protocols are used. This is done by sending sequences as are exemplified in the following:

"HOB RD-VPN SMTP V1.1" for SMTP sending protocol and
"HOB RD-VPN POP3 V1.1" or
"HOB RD-VPN IMAP4 V1.1"
for using POP3 or IMAP4 as protocol for receiving mails from the mail server 3'.

The server side gateway 5' accordingly initiates a connection 12 to the e-mail server 3'. At first the information about the protocols to be used and further information, like sender and recipient data of the mail are exchanged via the client side gateway 4' and server side gateway 5'. This information is transmitted by the client side gateway 4' and server side gateway 5' as sender side or receiver side gateway, respectively as it is, i.e. uncompressed. At the most a record oriented compression as explained in connection with FIG. 1 can be applied to the introducing message parts, e.g. concerning address or name information.

When the actual message, e. g. the text part of the e-mail, is to be sent the client side gateway 4' compresses the complete text data and sends them under the connection oriented protocol SMTP to the server side gateway 5' as a compressed data file.

The server side gateway 5' decompresses this compressed data file and combines the decompressed message part with the further uncompressed message components to the complete message, which in turn is sent to the mail server 3' for further handling.

Whereas above message transmission refers to an e-mail sent from the e-mail client 2' to the mail server 3', as is outlined by the double arrow 13 in FIG. 2, e-mail transmissions from the mail server 3' to the e-mail client 2' (see double arrow 14 in FIG. 2) are handled under the POP3 or IMAP4 protocol via the connections 10, 11, 12.

As can be seen from the foregoing due to the compression of the data transmission less data are to be transferred via the internet connection 1 between the e-mail client 2' and the e-mail server 3'.

Special consideration is given to the fact that in general e-mail data are encoded with a so called Base64 encoding, which gives rise to a further compression possibility, as can be exemplified as follows:

A test e-mail has following content:

Hallo Test
---MIME---
AAAABBBB

In the hexadecimal system this e-mail is represented by the following hex code:

| | | | | | | | | | | | | | | | |
|---|---|---|---|---|---|---|---|---|---|---|---|---|---|---|---|
| 48 | 61 | 6C | 6C | 6F | 20 | 54 | 65 | 73 | 74 | 0D | 0A | 2D | 2D | 2D | 4D |
| 49 | 4D | 45 | 2D | 2D | 2D | 0D | 0A | 41 | 41 | 41 | 41 | 42 | 42 | 42 | 42 |
| 0D | 0A | 2E | 0D | 0A | | | | | | | | | | | |

This hex code is pre-compressed by the following process:

The portion "Hallo Test" is regular text, which is not Base64-coded, what is marked by an escape sequence:

F1 18.

After that the hex code for the text "Hallo Test" follows in unamended manner:

| 48 | 61 | 6C | 6C | 6F | 20 | 54 | 65 | 73 | 74 | 0D | 0A | 2D | 2D | 2D | 4D |
| 49 | 4D | 45 | 2D | 2D | 2D | 0D | 0A | | | | | | | | |

The Base64-coded MIME-portion of the e-mail follows, which is introduced by the following escape sequence:

F2 06.

The following data in the e-mail are decoded by removing the Base64 coding, i.e.

41 41 41 41=000000 000000 000000 000000 is transferred to 0000 0000 0000 0000 0000 0000=00 00 00

The sequence 42 42 42 42=000001 000001 000001 000001 is transferred to 0000 0100 0001 0000 0100 0001=04 10 41

Summing up the sequence 41 41 41 41 42 42 42 42 is foreshortened to read 00 00 00 04 10 41

Finally the end-of-mail sequence is replaced by a special sequence F0.

The final pre-compressed hex code sequence thus reads:

| F1 | 18 | 48 | 61 | 6C | 6C | 6F | 20 | 54 | 65 | 73 | 74 | 0D | 0A | 2D | 2D |
| 2D | 4D | 49 | 4D | 45 | 2D | 2D | 2D | 0D | 0A | F2 | 06 | 00 | 00 | 00 | 04 |
| 10 | 41 | F0 | | | | | | | | | | | | | |

With Base64 encoding the volume of the data grows, since the encoding results in 4 bytes of transmission data out of 3 bytes net data. So the sender side gateway 4' or 5' suppresses the Base64 coding before the actual compression is done. Of course, the receiver side gateway 5' or 4' then has to do Base64 coding on the decompressed data again.

Generalizing aforesaid example of Base64 removal the sender side gateway 4' provides for a multiple compression by analyzing data to be compressed, like the email, as concerns removable data overhead, like the Base64-coded portion based on the knowledge of the e-mail protocol actually describing said Base64 encoding of the MIME-portion, removing this data overhead as a pre-compressing and further compressing the remaining data in the according compression steps.

To tell the receiver side gateway 4' or 5', when the compressed part of the transmission starts and ends and if Base64 coding has to be done, the gateways 4', 5' use the following protocol as was already outlined above: The data are separated into blocks, which, for protocol specific reasons, should have a size of 16383 (=$2^{14}$–1) bytes, if possible. These blocks contain the following information to control the compression:

One byte 0xF1 followed by a length indicating integer number starts a compressed block of the specified length. One byte 0xF2 followed by a length indicating integer number starts a compressed block of specified length that has to be Base64 coded. A single byte 0xF0 replaces the usual end of message markings of the protocol used (, e.g. 0x0D 0x0A 0x2E 0x0D 0x0A, for SMTP and POP3), therefore identifying the end of a compressed message.

What is claimed is:

1. A method for transmitting a message, enclosed in a plurality of data packets, by compressed data transmission between a sender (2') and a receiver (3') via a data network (1) comprising the steps of
   A) providing for a sender side gateway (4') associated to said sender (2') and a receiver side gateway (5') associated to said receiver (4'),
   B) the sender (2') transmitting the message to the sender side gateway (4'),
   C) the sender side gateway (4') analyzing the message for compressible message parts and uncompressible message components,
   D) the sender side gateway (4') using a file oriented compression, compresses a compressible part of the message with a compression process that analyzes the compressible part and optimizes compression accordingly,
   E) the sender side gateway (4')
      1) placing the compressible part of the message compressed by file oriented compression in at least one compressed data file and transmitting the at least one compressed data file to the receiver side gateway (5')
      2) compressing the message components, which are uncompressible using file oriented compression, using instead a record oriented compression comprising successively compressing data records to form compressed data records by using a compression process that collects and analyzes said data records, and optimizes compression from data record to data record,
      3) transmitting the compressed data records to the receiver side gateway,
      4) transmitting the message components that are uncompressible, using either file oriented compression or record oriented compression, to the receiver side gateway without compression,
   F) the receiver side gateway (5') decompressing the compressed data file and combining the decompressed message part with the uncompressible message components to reconstitute the original message, and
   G) the receiver side gateway (5') sending said reconstituted message to the receiver (3').

2. The method according to claim 1, wherein the compressible part of the message is a text or table part.

3. The method according to claim 1, wherein before step E) the sender side gateway (4') adds an information about the end or length of the compressed data file to the message components to be transmitted.

4. The method according to claim 1, wherein in step E) the sender side gateway (4') in a flush action transmits the compressed data file according to the rules of the compression process, after having reached an end of the compressible part of the message or according to acknowledgement rules.

5. The method according to claim 1, wherein the message is an email with text parts as compressible message parts and email headers as uncompressible message components.

6. The method according to claim 5, wherein Base64 encoding of an email message is suppressed by the sender side gateway before compressing the text parts of the email message.

7. The method according to claim 1, wherein as connection oriented protocol one of SMTP, POP3, IMAP4 and FTP is used for the message transmission.

8. The method according to claim 1, wherein the sender side gateway (4, 4') provides for a multiple compression by analyzing data to be compressed as concerns removable data overhead due to specified protocol features, removing this data overhead and further compressing the remaining data.

* * * * *